3,511,823
METHODS OF POLYMERIZING N-VINYL LACTAMS
Marvin R. Leibowitz, Edison, and Frederick Grosser, Midland Park, N.J., assignors to GAF Corporation, a corporation of Delaware
No Drawing. Continuation-in-part of application Ser. No. 307,357, Sept. 9, 1963. This application Aug. 16, 1967, Ser. No. 660,920
Int. Cl. C08f 7/12
U.S. Cl. 260—88.3    11 Claims

ABSTRACT OF THE DISCLOSURE

A method for the production of insoluble polymers of N-vinyl lactams which comprises heating an N-vinyl lactam at a temperature of from about 40° C. to about 200° C. in the presence of a catalytic amount of a catalyst selected from the group consisting of hydrides and borohydrides of alkali metals or mixtures of these catalysts with a member of the group consisting of the alkali metals, alkaline earth metals and the oxides, hydroxides and alkoxides corresponding thereto.

---

This application is a continuation-in-part of our parent application Ser. No. 307,357, filed Sept. 9, 1963, and now abandoned.

BACKGROUND OF THE INVENTION

Field of the invention

The present invention relates, in general, to the polymerization of N-vinyl lactams and, in particular, to novel methods of polymerizing N-vinyl pyrrolidone to produce insoluble polymers thereof.

Description of the prior art

Polymers of N-vinyl lactams and particularly N-vinyl pyrrolidone of the type that are soluble in water and many common organic solvents, are well known and widely used in industry as stripping agents in processes for the dyeing of textiles; dispersants in suspension polymerizations; thickening agents for pharmaceuticals, veterinarian and cosmetic preparations; constituents of adhesive and sizing compositions; binders for special lithographic and printing processes and as modifiers or replacements for gum arabic; gelatin or polyvinyl alcohol. In addition, perhaps the most widely known and most successful use of soluble polyvinyl pyrrolidone has been its use as a blood plasma colloid as Periston-type solutions for intravenous use in shock therapy.

Only recently has it been discovered that insoluble polymers of N-vinyl lactams such as N-vinyl pyrrolidone could be obtained by heating a lactam such as N-vinyl pyrrolidone at an elevated temperature in the presence of a small amount of a catalyst consisting essentially of a compound selected from the group consisting of alkali metals and alkaline earth metals and their corresponding oxides, hydroxides and alkoxides. This discovery apparently represents a pioneer effort in the development of insoluble polymers of N-vinyl pyrrolidone and, as may be expected in any development of this type, many problems arose in the attempted commercial development of the process. One such problem that presently exists is that in order for the polymerization to take place, the N-vinyl pyrrolidone must be in a relatively high state of purity. It was also noted that a relatively long induction period at relatively high temperatures was required before the polymerization took place. In addition, the polymers so produced varied in color from white to nearly white. Accordingly, several problems remain in the art for the consistent production of substantially pure insoluble polymers of N-vinyl pyrrolidone in an efficient manner.

SUMMARY OF THE INVENTION

Accordingly, it is an object of this invention to provide improved methods of producing insoluble polymers of N-vinyl lactams which overcomes or otherwise mitigates the problems inherent in prior art processes.

Another object of this invention resides in the provision of novel catalytic methods of polymerizing N-vinyl lactams to produce insoluble polymers thereof.

Yet another object of this invention resides in the provision of improved catalytic methods of producing insoluble polymers of N-vinyl pyrrolidone wherein the use of a less pure N-vinyl pyrrolidone starting material does not inhibit the polymerization reaction.

Still another object of this invention is the provision of novel catalytic methods for the polymerization of N-vinyl pyrrolidone wherein the induction period is shorter and lower temperatures can be employed.

Further objects and advantages of the invention will become further apparent from the following detailed description thereof.

The accomplishment of one or more objects of the invention is readily achieved by methods which comprise heating an N-vinyl lactam at an elevated temperature in the presence of a catalytic amount of a catalyst selected from the group consisting of hydrides and borohydrides of alkali metals mixtures thereof, or mixtures of hydrides and borohydrides of alkali metals with a member of the group consisting of alkali metals, alkaline earth metals and the oxides, hydroxides and alkoxides corresponding thereto, for a period of time sufficient to produce insoluble polyvinyl lactams.

DESCRIPTION OF PREFERRED EMBODIMENTS

As used herein the terms, "insoluble polyvinyl lactams" or "insoluble polyvinyl pyrrolidone" are intended to define products which are insoluble in water, strong mineral acids, caustic solutions and common organic solvents and to distinguish from the soluble polymeric materials based on N-vinyl pyrrolidone known in the art as represented by U.S. 2,265,450 and 2,335,454.

The classes of catalysts which have been found effective in promoting the polymerization of N-vinyl lactams according to this invention include the hydrides and borohydrides of the alkali metals. Representative alkali metal hydrides and borohydrides which have been tested and found effective include sodium borohydride, potassium borohydride and sodium hydride. Other alkali metal hydrides and borohydrides which can also be employed include lithium hydride, lithium borohydride, cesium hydride, cesium borohydride, rubidium hydride and rubidium borohydride. If desired, mixtures of alkali metal hydrides and/or alkali metal borohydrides can be employed as catalysts for the polymerization.

In another aspect of this invention, the provision for the use of alkali metal hydrides and/or borohydrides in combination with alkali and alkaline earth metals and their corresponding oxides, hydroxides and alkoxides is included since it has been found that such mixtures are entirely suitable for polymerizing the N-vinyl lactams to insoluble polymers. Indeed, in certain instances it appears that a synergistic effect is obtained which is better than either of the catalysts alone.

The amount of catalyst necessary to effect polymerization of the N-vinyl lactam is not necessarily a critical feature of the invention and can be varied over a wide range of from about 0.1 weight percent to about 10.1 weight percent based on monomer although amounts above and below this range can be employed if desired.

An amount of catalyst of about 1.0 weight percent provides an optimum of reaction rates and reaction times and is, therefore, preferred.

In the embodiment wherein the catalysts comprising alkali metal hydrides and/or borohydrides are employed in combination with alkali and alkaline earth metals and their corresponding oxides, hydroxides and alkoxides, the alkali metals, alkaline earth metals and their oxides, hydroxides and alkoxides should be employed in the range of about 1 to 10 parts per one part of hydride or borohydride. A preferred ratio for use of these mixtures of catalysts is about 3 to 4 parts of alkali metal, alkaline earth metal or oxides, hydroxides to one part of alkali metal hydride or borohydride.

The polymerization can be effected by heating the N-vinyl lactam over a wide range of temperatures of from about 40° C. to 200° C. under subatmospheric, atmospheric or superatmospheric conditions as desired.

If desired the polymerization of N-vinyl pyrrolidone can be effected in aqueous solution or can be carried out by dispersing the monomer in an inert organic diluent such as a hydrocarbon.

The reaction periods will vary considerably depending on a variety of factors such as catalyst, the temperature employed and the like. In general, however, polymerization can be effected over a period of about one-half hour to several hours.

In carrying out the methods of the invention, the N-vinyl lactam is charged to a reaction vessel equipped with a reflux condenser along with the desired catalyst. The contents of the reaction vessel are preferably agitated with a stirring device and heat applied to the contents and heated to reflux. Heating is continued until the liquid monomer turns to a powder. Within a short time the reaction is complete and the product is recovered by filtering, washing and drying the same.

The following examples will serve to further illustrate the practice of the invention with greater particularity although it is to be understood that the invention is not limited thereto.

EXAMPLE 1

To a 500 milliliter 4-necked flask equipped with an agitator and reflux condenser were charged 50 grams of N-vinyl pyrrolidone and 0.25 gram of sodium borohydride. The pressure on the flask was reduced to 100 millimeters of Hg absolute, agitation begun, and the mass heated to a reflux temperature of approximately 150° C. After approximately four hours at reflux the liquid N-vinyl pyrrolidone turned to a powder within a few minutes and filled most of the flask. The pressure was brought to atmospheric pressure whereupon 250 milliliters of water were added and the mass again heated to reflux (100° C.) for a period of one hour. The contents of the flask were then cooled, filtered on a Büchner funnel, washed and the resultant filter cake dried. There was provided 26.3 grams of insoluble polyvinyl pyrrolidone representing a yield of 52.5% of theory.

EXAMPLE 2

The same experimental procedure was employed as in Example 1 except that 0.5 gram of sodium hydride dispersed in a hydrocarbon solvent at a 50% solids content was employed in place of the sodium borohydride of Example 1. After approximately 1½ hours, polymerization took place yielding 31.8 grams of insoluble polyvinyl pyrrolidone representing a yield of 63.7% of theory.

EXAMPLE 3

To a 500 milliliter 4-necked flask equipped with an agitator and a reflux condenser was charged 50 grams of N-vinyl pyrrolidone and 0.75 gram of a 50% aqueous solution of a mixture containing 1 part of sodium borohydride and 3 parts of sodium hydroxide. The mixture was heated to a temperature of 150° C. at atmospheric pressure. Polymerization took place in 30 minutes and the polymer produced worked up in the same manner as in Example 1 and provided 33.7 grams of insoluble polyvinyl pyrrolidone, representing a yield of 67.4% of theory.

The above experiment illustrates the superiority of the mixed catalyst system over each catalyst alone by the fact that the polymerization took place with only a 30 minute induction period at a temperature of 150° C. under atmospheric pressure, thus eliminating the need for subatmospheric pressures.

EXAMPLE 4

The same experimental procedure was employed as illustrated in Example 3 with the same reactants. Polymerization of the system took place at 100° C. at atmospheric pressure and there was provided insoluble polyvinyl pyrrolidone in a yield of 71.9% of theory.

EXAMPLE 5

There were charged 50 grams of N-vinyl pyrrolidone (which had previously been treated with 0.5% of sodium hydroxide and which did not polymerize) to a reaction flask along with an additional 0.25 gram of sodium hydroxide. The contents of the flask were heated to a temperature of 150° C. at a pressure of 100 millimeters Hg for a period of 5 hours. Polymerization failed to take place with this system. However, when the same 50 grams of N-vinyl pyrrolidone was treated with 0.75 gram of a 50% aqueous solution containing 1 part of sodium borohydride and 3 parts of sodium hydroxide and heated to the same temperature at atmospheric pressure polymerization took place almost immediately and provided insoluble polyvinyl pyrrolidone in a yield of 64.8% of theory.

The above experiments demonstrate that the catalysts of the present invention can polymerize N-vinyl pyrrolidone of a less pure nature to produce an insoluble polyvinyl pyrrolidone whereas the alkali and alkaline earth oxides, hydroxides and alkoxides alone cannot.

While the invention has been described with particularity with respect to N-vinyl pyrrolidone, it can also be applied with ease to other N-vinyl lactams to obtain insoluble polymers therefrom.

Useful N-vinyl lactams which find immediate and practical utility in the methods of the invention can be conveniently characterized by the formula:

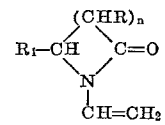

wherein each R individually represents a member selected from the group consisting of hydrogen, methyl and ethyl, $R_1$ represents a member of the group consisting of hydrogen and alkyl groups containing from 1 to 4 carbon atoms and $n$ represents a whole positive integer of from 2 through 4.

Typical N-vinyl lactams include N-vinyl pyrrolidinone itself, N-vinyl piperidone, N-vinyl caprolactam, N-vinyl-3-methyl pyrrolidinone, piperidone, or caprolactam, N-vinyl-4-methyl pyrrolidinone, piperidone or caprolactam, N-vinyl-5-methyl pyrrolidinone, piperidone, N-vinyl-3-ethyl pyrrolidinone, N-vinyl-4,5-dimethyl pyrrolidinone, N-vinyl-5,5-dimethyl pyrrolidinone, N-vinyl-3,3,5-trimethyl pyrrolidinone, N-vinyl-5-methyl-5-ethyl pyrrolidinone, N-vinyl-3,4,5-trimethyl-3-ethyl pyrrolidinone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl caprolactam, n-vinyl-7-ethyl caprolactam, N-vinyl-3,5-dimethyl caprolactam, N-vinyl-4,6-dimethyl caprolactam and N-vinyl-3,5,7-trimethyl caprolactam.

Thus, in accordance with the principle of the invention N-vinyl lactams of the type specified in the formula and specifically illustrated above can be polymerized to an insoluble polymer by reacting the same at an elevated temperature in the presence of a catalytic amount of a catalyst selected from the group consisting of hydrides and borohydrides of alkali metals.

What is claimed is:

1. A method for producing an insoluble polyvinyl lactam which comprises heating an N-vinyl lactam of the formula:

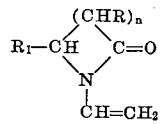

wherein each R individually represents a member selected from the group consisting of hydrogen, methyl and ethyl, $R_1$ represents a member of the group consisting of hydrogen and alkyl groups containing from 1 to 4 carbon atoms, and $n$ represents a whole positive integer of from 2 through 4, at a temperature of from about 40° C., to about 200° C., in the presence of a catalytic amount of a catalyst selected from the group consisting of hydrides and borohydrides of alkali metals.

2. A method according to claim 1 wherein the catalyst is present in an amount of from about 0.1 to 10.1 weight percent based on the weight of the N-vinyl lactam.

3. A method according to claim 1 wherein the catalyst is sodium borohydride.

4. A method according to claim 1 wherein the catalyst is potassium borohydride.

5. A method according to claim 1 wherein the catalyst is sodium hydride.

6. The method of producing insoluble polyvinyl pyrrolidone which comprises heating N-vinyl pyrrolidone under reflux conditions in the presence of a catalytic amount of a catalyst selected from the group consisting of hydrides and borohydrides of alkali metals and mixtures of the same for a period of time sufficient to produce a powder and recovering the polyvinyl pyrrolidone thus produced.

7. A method of producing an insoluble polyvinyl lactam which comprises heating an N-vinyl lactam of the formula:

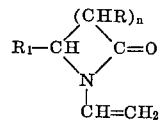

wherein each R individually represents a member selected from the group consisting of hydrogen, methyl and ethyl, $R_1$ represents a member of the group consisting of hydrogen and alkyl groups containing from 1 to 4 carbon atoms, and $n$ represents a whole positive integer of from 2 through 4, at a temperature of from about 40° C., to about 200° C., in the presence of a catalytic amount of a catalyst comprising (a) 1 part of a member of the group consisting of hydrides and borohydrides of alkali metals, and (b) 1 to 10 parts of a member of the group consisting of alkali metals, alkaline earth metals and the oxides, hydroxides and alkoxides corresponding thereto.

8. A method according to claim 7 wherein (a) is sodium borohydride and (b) is sodium hydroxide.

9. A method according to claim 7 wherein (a) is potassium borohydride and (b) is potassium hydroxide.

10. A method according to claim 7 wherein the catalyst mixture comprises 3 to 4 parts of (a) to 1 part of (b).

11. A method according to claim 7 wherein the N-vinyl lactam is N-vinyl pyrrolidone.

References Cited

UNITED STATES PATENTS 3,277,066   10/1966   Grosser et al.
3,306,886   2/1967   Grosser et al.

HARRY WONG, Jr., Primary Examiner